United States Patent Office 2,872,454
Patented Feb. 3, 1959

2,872,454

SPIRO-HYDANTOINS FROM 4-CHLORO-HYDRINDONE

Wilson Shaw Waring, Manchester, England, assignor to Imperial Chemical Industries Limited, London, England, a corporation of Great Britain No Drawing. Application September 23, 1957
Serial No. 685,378

Claims priority, application Great Britain
October 18, 1956

3 Claims. (Cl. 260—309.5)

This invention relates to new heterocyclic compounds and more particularly it relates to new hydantoin compounds which we have found to possess anticonvulsant properties.

According to the invention we provide new hydantoin compounds of the formula:

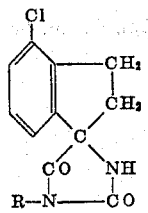

wherein R stands for hydrogen or for a lower alkyl radical.

It is to be understood that the hydantoin compounds are named by us as spirohydrindenyl-[1:5']-hydantoins and the location of substituents is determined by the numbered positions as indicated in the formula:

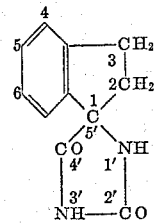

According to a further feature of the invention we provide a process for the manufacture of the said new hydantoin compounds of the formula stated above wherein R stands for hydrogen which comprises subjecting the corresponding hydrindone-(1) of the formula:

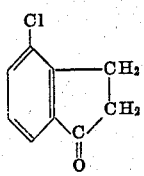

to the process known to the art as the Bucherer hydantoin synthesis.

It is to be understood that by the expression "Bucherer hydantoin synthesis" we mean that process known to the art for the manufacture of hydantoin compounds (H. T. Bucherer and V. A. Lieb, Journal für Praktische Chemie, 1934, volume 141, page 5). Thus as a suitable means of carrying out the said Bucherer hydantoin synthesis there may be mentioned for example interaction of a mixture comprising 4-chlorohydrindone-(1), hydrogen cyanide or an alkali metal cyanide for example sodium or potassium cyanide, ammonia or an ammonium salt for example ammonium chloride and carbon dioxide. The ammonia or ammonium salt and carbon dioxide may conveniently be present in the medium in the form of ammonium carbonate or ammonium carbamate.

The said Bucherer synthesis may conveniently be carried out by heating the reactants together for example at a temperature of about 50–55° C. in the presence of an inert solvent or diluent. As a suitable inert solvent or diluent there may be mentioned for example an aqueous medium for example water or aqueous alcohol for example 50% by weight of aqueous ethanol.

As a preferred feature of the said process, one molecular proportion of 4-chlorohydrindone-(1) is heated with about 2 molecular proportions of an alkali metal cyanide for example sodium or potassium cyanide and about 4 molecular proportions of ammonium carbonate in a medium of 50% by weight of aqueous ethanol at a temperature of about 50–55° C.

It has been suggested by Bucherer and Steiner (Journal für Praktische Chemie, 1934, volume 140, page 291), and is mentioned here merely by way of explanation, that a ketone is converted into a hydantoin by way of the corresponding cyanohydrin and the corresponding aminonitrile according to reactions which may be indicated as follows:

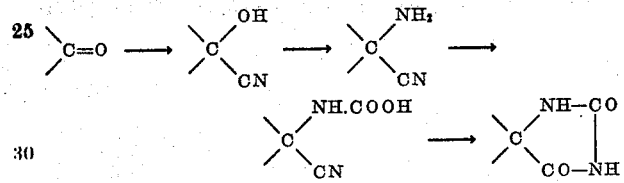

Accordingly, it will be evident that the corresponding hydrindone-(1) used as starting material may be replaced by the corresponding hydrindone-(1) cyanohydrin or by the corresponding hydrindone-(1) aminonitrile, the cyanohydrin requiring in addition ammonia or an ammonium salt and a source of carbon dioxide to effect the process of manufacture and the aminonitrile requiring a source of carbon dioxide to effect the process of manufacture. The corresponding hydrindone-(1) used as starting material may also be replaced by a suitable functional derivative of the hydrindone-(1) which under the conditions of the reaction reacts in effect like the hydrindone-(1).

According to a further feature of the invention we provide a process for the manufacture of the new hydantion compounds of the formula stated above wherein R stands for a lower alkyl radical which comprises lower alkylation of the corresponding compound of the formula:

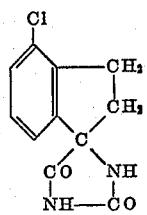

As suitable lower alkylating agents there may be mentioned for example lower alkyl sulphates for example dimethylsulphate and lower alkyl halides, for example methyl iodide and ethyl iodide. The reaction is preferably carried out in an aqueous or aqueous alcoholic alkaline medium for example an aqueous or aqueous alcoholic sodium hydroxide medium.

The said new hydantoin compounds possess valuable anticonvulsant properties. In particular, 4-chlorospirohydrindenyl-[1:5']-hydantoin and 4-chloro-3'-methylspirohydrindenyl-[1:5']-hydantoin have been found to be markedly active as anticonvulsants and it is likely that the said compounds will be of value in the control of epilepsy.

The invention is illustrated but not limited by the following examples in which the parts are by weight:

*Example 1*

A mixture of 8 parts of 4-chlorohydrindone-(1), 22 parts of ammonium carbonate, 6.5 parts of potassium cyanide, 200 parts of methanol and 200 parts of water is stirred and heated at 50–55° C. for 72 hours. The alcohol is then removed by distillation under reduced pressure and the residue is made acid to Congo red by the addition of concentrated aqueous hydrochloric acid. The mixture so obtained is filtered and the solid residue is dissolved in dilute aqueous sodium hydroxide solution, the solution filtered and the filtrate is acidified with aqueous hydrochloric acid. The mixture is then filtered and the solid residue is crystallised from methanol to give 4-chlorospirohydrindenyl-[1:5']-hydantoin, as a colourless crystalline solid, M. P. 240–241° C.

*Example 2*

1.3 parts of dimethylsulphate are added slowly, with stirring, to a solution of 2.2 parts of 4-chlorospirohydrindenyl-[1:5']-hydantoin (obtained as described in Example 1) in 10 parts of 4% aqueous sodium hydroxide solution, keeping the temperature below 40° C. After stirring for 1 hour, the reaction mixture is filtered and the solid residue is crystallised twice from methanol to give 4-chloro-3'-methylspirohydrindenyl - [1:5'] - hydantoin, as a colourless crystalline solid, M. P. 187–188° C.

What we claim is:
1. New hydantoin compounds of the formula:

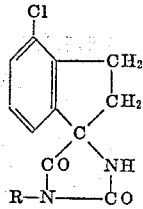

wherein R stands for a member of the group consisting of hydrogen and a lower alkyl radical.
2. 4-chlorospirohydrindenyl-[1:5']-hydantoin.
3. 4-chloro-3'-methylspirohydrindenyl - [1:5'] - hydantion.

References Cited in the file of this patent

Bucherer et al.: Journal für Pracktische Chemie, vol. 140 (1934), pp. 291–36.

Bucherer et al.: Journal für Pracktische Chemie, vol. 141 (1934), pp. 5–43.

Henze et al.: J. Am. Chem. Soc., vol. 64 (1942), pp. 522–523.

Henze et al.: J. Am. Chem. Soc., vol. 65 (1943), pp. 963–965.